United States Patent
Takeda (12)

(10) Patent No.: US 6,867,788 B1
(45) Date of Patent: Mar. 15, 2005

(54) VIEW COMPOSITION SYSTEM FOR SYNTHESIZING MULTIPLE VISUAL REPRESENTATIONS OF MULTIPLE DATA SETS

(75) Inventor: Koichi Takeda, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/327,512

(22) Filed: Jun. 8, 1999

(30) Foreign Application Priority Data

Jul. 15, 1998 (JP) .......................................... 10-200118

(51) Int. Cl.$^7$ .............................................. G06F 17/30
(52) U.S. Cl. ...................... 345/630; 345/629; 345/440; 345/440.1; 345/440.2
(58) Field of Search ................ 345/629, 630, 345/632, 633, 440, 440.1, 440.2

(56) References Cited

U.S. PATENT DOCUMENTS 4,674,042 A * 6/1987 Hernandez et al. ......... 715/503
4,674,043 A * 6/1987 Hernandez et al. ......... 364/401

(List continued on next page.)

FOREIGN PATENT DOCUMENTS

| JP | 10-40322 | 2/1998 |
| JP | 10-040261 | 2/1998 |

OTHER PUBLICATIONS http://www.visualmining.com/examples/styles/combo.html.*

"Combo charts", 1996–2003 Visual Mining, Inc.http://www.visualmining.com/examples/styles/combo.html.*

"Davisor chart users' guide–combo charts", http://products-.davisor.com/chart/doc/usersguide/charttypes/combo/index, html.*

"Krysalis community project jcharts", http://jcharts.krysalis.org/samples/combo.html.*

Masayuki Morohashi, Koichi Takeda, "Uniform Way for Retrieving Heterogeneous Data", dated Apr. 18, 1996, pp. 53–60, Information Processing Society of Japan vol. 96 No. 34 SIG Notes.

Hiroshi Nomiyama, Koichi Takeda, "Information Outlining as a Paradigm of Information", dated Jan. 16, 1997, pp. 115–122, IBM Research, Tokyo Research Laboratory.

"Dining mining," Jul. 1, 1998, pp. 81–86, Computopia, vol. 33 No. 382 Computer Age. Co., Ltd.

*Primary Examiner*—Matthew Luu
*Assistant Examiner*—Daniel J Chung
(74) *Attorney, Agent, or Firm*—Louis J. Percello, Esq.; McGinn & Gibb, PLLC

(57) ABSTRACT

To provide a more flexible and higher level visualization technique for combining a plurality of analysis methods and visual representations, a view composition system, for combining a plurality of visual representations, includes a view manager for managing as a view a set of data for individual visual representation, a view retriever for retrieving from a plurality of views those views that can be combined, and a view composer for combining the views obtained by the view retriever. Optionally, a view displayer, displays the view produced by the view composer. The view composition system can combine a plurality of views using the superimposition of views and neighboring dimensions that have compatible domains.

27 Claims, 7 Drawing Sheets

Arrangement of view composition apparatus

U.S. PATENT DOCUMENTS

| | | | | |
|---|---|---|---|---|
| 4,800,510 A | * | 1/1989 | Vinberg et al. | 345/440 |
| 4,815,029 A | * | 3/1989 | Barker et al. | 345/765 |
| 5,050,221 A | * | 9/1991 | Ohta et al. | 382/177 |
| 5,228,119 A | * | 7/1993 | Mihalisin et al. | 345/418 |
| 5,307,455 A | * | 4/1994 | Higgins et al. | 345/440 |
| 5,309,171 A | * | 5/1994 | Nakatani | 345/140 |
| 5,313,571 A | * | 5/1994 | Hirose et al. | 395/140 |
| 5,375,201 A | * | 12/1994 | Davoust | 345/440 |
| 5,459,829 A | * | 10/1995 | Doi et al. | 345/420 |
| 5,485,564 A | * | 1/1996 | Miura | 345/440 |
| 5,491,779 A | * | 2/1996 | Bezjian | 345/419 |
| 5,548,703 A | * | 8/1996 | Berry et al. | 395/160 |
| 5,550,964 A | * | 8/1996 | Davoust | 345/440 |
| 5,581,677 A | * | 12/1996 | Myers et al. | 395/140 |
| 5,710,900 A | * | 1/1998 | Anand et al. | 345/764 |
| 5,752,253 A | * | 5/1998 | Geymond et al. | 715/503 |
| 5,754,808 A | * | 5/1998 | Tanaka et al. | 395/339 |
| 5,812,983 A | * | 9/1998 | Kumagai | 705/3 |
| 5,844,572 A | * | 12/1998 | Schott | 345/440 |
| 5,883,635 A | * | 3/1999 | Rao et al. | 345/440 |
| 5,956,691 A | * | 9/1999 | Powers | 705/4 |
| 5,999,192 A | * | 12/1999 | Selfridge et al. | 345/440 |
| 6,016,502 A | * | 1/2000 | Haneda et al. | 707/509 |
| 6,104,410 A | * | 8/2000 | Wong | 345/440 |
| 6,191,792 B1 | * | 2/2001 | Iizuka et al. | 345/581 |
| 6,256,030 B1 | * | 7/2001 | Berry et al. | 345/357 |
| 6,266,067 B1 | * | 7/2001 | Owen et al. | 345/433 |

* cited by examiner

Chart for sales of air conditioners and average summer temperatures

Combined chart of air conditioner sales/average summer temperatures

Combined chart of
air conditioner sales/newspaper articles

Arrangement of view composition apparatus

Spiral arrangement of combinable views

Cross-shaped arrangement of combinable views

Selection menu for available neighboring view
(for X axis)

View composition method

US 6,867,788 B1

VIEW COMPOSITION SYSTEM FOR SYNTHESIZING MULTIPLE VISUAL REPRESENTATIONS OF MULTIPLE DATA SETS

BACKGROUND OF THE INVENTION

1. Field of the Invention

The present invention relates to a technique for employing various analysis and visualization methods for a large database containing both text and numerical data.

In particular, the present invention pertains to a method and a system for producing a viable combination of means, selected from a a plurality of analysis methods and their visualization methods, for locating an item of information that is difficult to find using a single visualization method, and to improve the reliability of a result obtained by analysis.

2. Description of the Related Art

In the data retrieval or data warehousing (storage) field, it is very important that data be analyzed from various perspectives and that the data be presented visually in order for features, obscured in large amounts of data, to be detected, and for new facts to be revealed. For the conventional data retrieval or data analyses methods for which on-line analytical processing (OLAP) is used, effectively combined are various statistical processes, data analyses, such as dicing/slicing, and visualizations, represented by business graphs or charts, that enable a user to pick out important features and trends that cannot be detected merely by referring directly to raw data.

However, even when a sophisticated independent analysis method and its visualization process are employed, there is no systematic means available to comply with a request that a plurality of analysis methods and visual representations be combined to search for elements that are not readily assessable when a single analysis method is used, or to assure that adequate analysis results will be provided. The analyzation and visualization of data are performed only in accordance with a user's instinct.

For example, a user may not notice the existing relationship between a time period having an unseasonably low temperature (e.g., a cool summer) and the sales of air conditioners when the two separate sets of data in FIG. 1 are referred to individually. However, when these data are displayed synchronously, along the same time axis, as is shown in FIG. 2, to the user the positive correlation between the data sets will be immediately apparent.

In the database field, studies have been made of a visual query for which a visualization technique is used. However, for this study it is more important that a change in one search result or a change in one variable query be visualized interactively, so that a user can select an optimal query. No means is now available whereby a user can make a decision by visualizing data without a visual query.

Since the conventional analysis method and visualization are fixed or are under the complete control of a user, no system is provided that combines a plurality of mutually associated analysis methods and their visualization methods and that assures the integrity of the analysis results, or that is able to infer new information from phenomena that do not seem at a glance to be related to each other.

Furthermore, with the conventional method, a plurality of graphs displayed on a screen are combined, or functions are combined, to display a graph. Therefore, it is implicitly assumed that all the displayed graphs have a common numeral attribute along the X axis and the Y axis. As a result, no method is provided for incorporating all the graphs that can ordinarily be used, or for calculating an available composition or a neighboring representation using a set of data that are the source for the graphic representation.

SUMMARY OF THE INVENTION

In view of the foregoing and other problems of the conventional method and s structures, it is, therefore, one object of the present invention to provide a more flexible and higher level visualization technique for combining a plurality of analysis methods and visual representations.

It is another object of the present invention to provide a system for combining a plurality of analysis methods and visualization methods to better assure the integrity of the analysis results, and for obtaining new information from phenomena that at a glance do not seem to be related to each other.

It is an additional object of the present invention to provide means for combining a plurality of analysis methods and visualization methods in order to enable a user to make a determination by referring to data.

It is a further object of the present invention to provide a method and a system for ensuring all the graphs that are represented can be employed normally, and a composition and a neighboring representation that can be obtained by referring to the set of data that are the source for the graphs.

In a first aspect of the present invention, a method and structure are provided for combining a plurality of visual representations, which include view management means for managing as a view a set of data for individual visual representation; view retrieval means for retrieving from a plurality of views those views that can be combined; view composition means for combining the views obtained by the view retrieval means; and view display means for displaying the view produced by the view composition means. The view composition system of the invention can combine a plurality of views using the superimposition and neighboring of views that have compatible domains.

Visual representations are various forms of data representations, and include, for example, a graph that describes an associated economic trend, a pie chart that is used to convey information, statistical analysis chart, a table representation, or text.

A view that is constituted by a set of data for visualization is described using the number of dimensions, the domains for the individual dimensions, the calculation procedures for arranging visual elements in the view, the inclusionship relation of the domains, and the superordinate/subordinate relations. Based on the description of the view, associated views that can be combined are searched for (calculated), and a set of views obtained by calculation are combined (superimposed or arranged as neighbors on a two-dimensional screen). The arrangement of the views may be performed only in the memory, but it is preferable that the arrangement be displayed on the screen by the view display means.

Specific examples for a set of data could be attributes of the elements of a data set (e.g., the month, the names of branch offices, sales), the domains of individual attributes (e.g., a possible set of values, such as January to December, the names of prefectures, 0 to 100 million money units (e.g., dollars, euros, yen, etc.) the hierarchical relationship between domains (e.g., days are subcategorization of months), and the correspondence of values between two frequently employed attributes (e.g., domains, such as a one-to-one correspondence is ensured for the names of general managers and the names of branch offices).

Therefore, the system can examine the database search results or available representations (views) of a specific data file, and can retrieve (calculate) and display a combination of views for which composition/neighboring is ensured (a user may select such a combination).

With this arrangement, all the representations of graphs that are ordinarily employed are obtained, and compositions and neighboring representations can be computed at the level of a set of data that are the source of the representations for the graphs.

The present disclosure relates to subject matter contained in Japanese Patent Application No. 10-200118, filed Jul. 15, 1998, which is expressly incorporated herein by reference in its entirety.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 3:
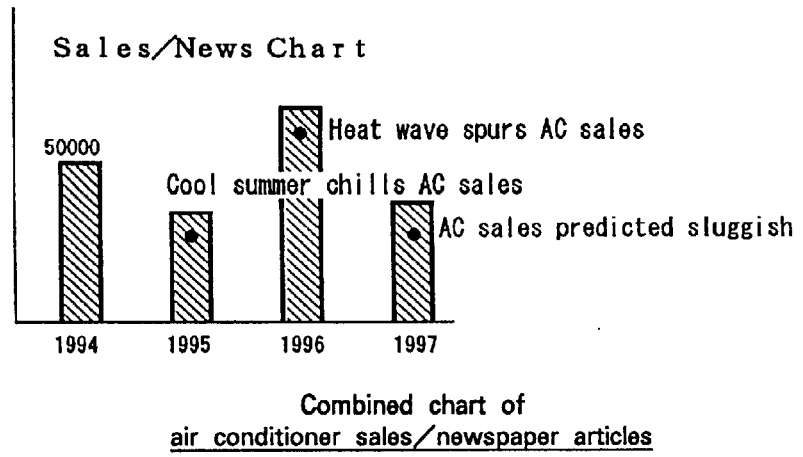
FIG. 3 is a combined chart for air conditioner sales and newspaper articles.
Figure 4:
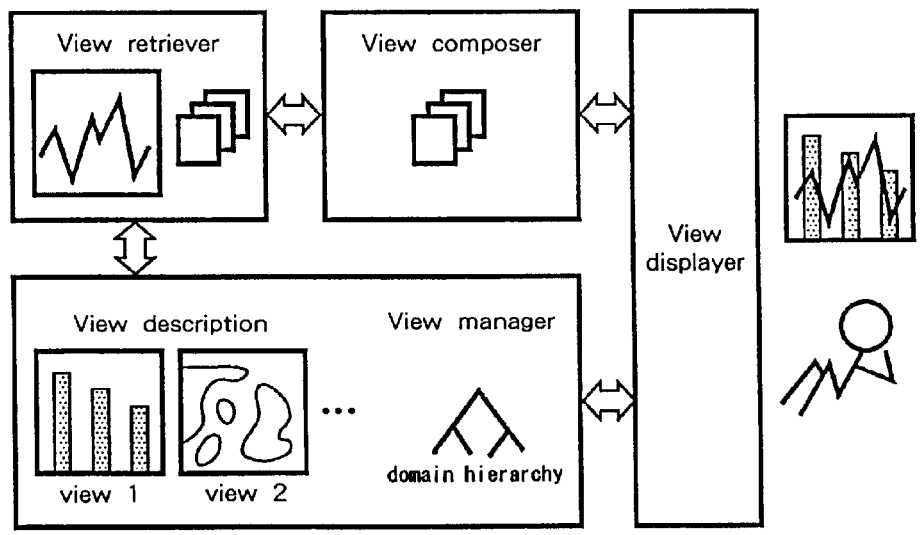
FIG. 4 is a diagram showing an exemplary arrangement for a view composition system according to the present invention.
Figure 5:
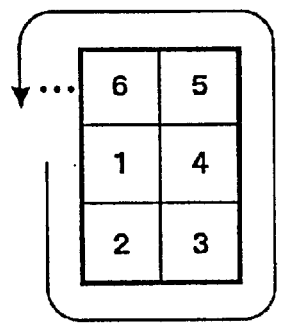
FIG. 5 is a diagram showing the spiral arrangement of combinable views.
Figure 6:
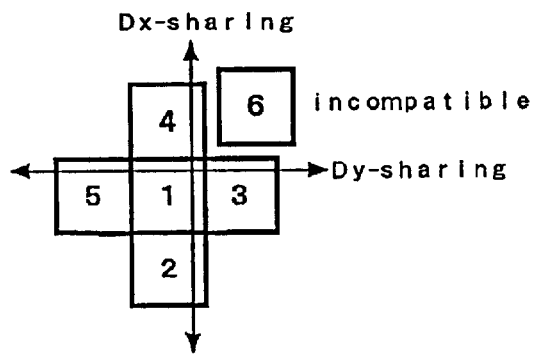
FIG. 6 is a diagram showing a cross-shaped arrangement of combinable views.
Figure 7:
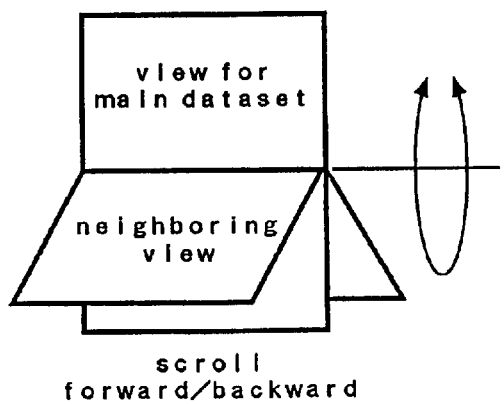
FIG. 7 is a diagram showing a selection menu (for the X axis) of views that are available for neighboring.
Figure 8:
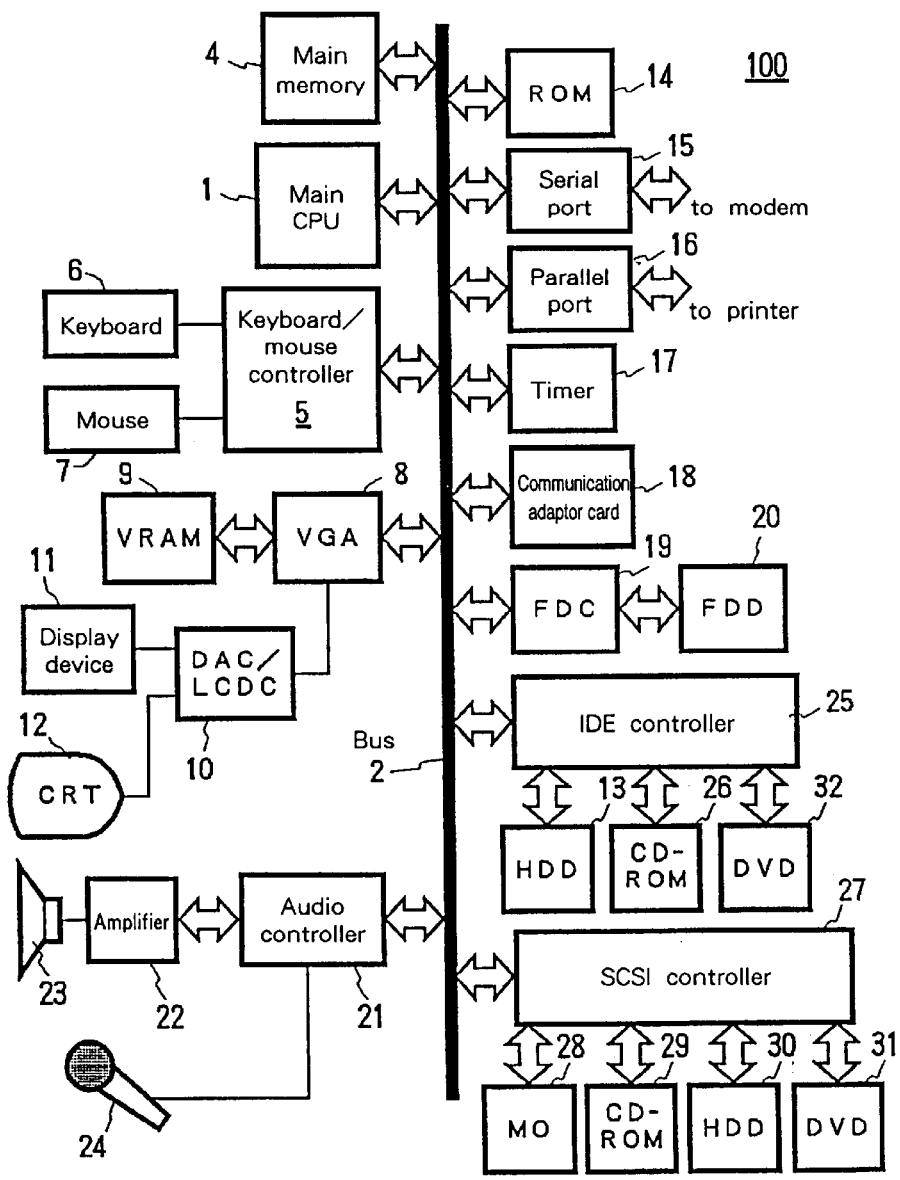
FIG. 8 is a diagram showing an exemplary hardware arrangement for a view composition system according to the present invention.

Referring now to the drawings, and more particularly to FIGS. 1–11, there are shown preferred embodiments of the method and structures according to the present invention.
First Embodiment In a first embodiment, FIG. 4 illustrates a block diagram of a view composition system. As is shown in FIG. 4, this system comprises four blocks which are a view manager, a view retriever, a view composer, and a view displayer. In FIG. 8 there is shown a sample hardware arrangement for a system operated by the blocks in FIG. 4.

A system 100 comprises a central processing apparatus (CPU) 1 and a memory 4. The CPU 1 and the memory 4 are connected by a bus 2 and an IDE controller 25 to a hard disk drive 13 (or to a storage medium drive, such as an MO, a CD-ROM 26 or a DVD 32), which is an auxiliary storage device. Similarly, the CPU 1 and the memory 4 are connected by the bus 2 and a SCSI controller 27 to a hard disk drive 30 (or to a storage medium drive, such as an MO 28, a CD-ROM 29 or a DVD 31), which is an auxiliary storage device. A floppy disk drive 20 is connected to the bus 2 via a floppy disk controller 19.

It is preferable that a view description, such as the number of dimensions, the domains for the individual dimensions, the calculation procedures for arranging elements, the inclusionship relation of the domains and the superordinate/subordinate relations etc., be stored as a set of visual representations on an auxiliary storage device.

Based on the view description, associated views that can be combined are calculated by the CPU 1 using the memory 4. The views that are obtained through the calculation are combined, and the resultant view is arranged in the memory 4 or in a VRAM 9, and is displayed on a CRT 12.

A floppy disk is inserted into the floppy disk drive 20. Code or data for a computer program that interacts with an operating system and issues an instruction to the CPU 1 to implement the present invention can be stored on the floppy disk or on the hard disk drive 13 (or on the MO, the CD-ROM 26 or the DVD 32) and in a ROM 14. This computer program is executed by loading it into the memory 4. The code for the computer program can be compressed, or can be divided into a plurality of segments for storage on a plurality of storage mediums.

The system 100 further includes user interface hardware components such as a pointing device (a mouse or a joystick) 7 and a keyboard 6 for entering data, and a display device 12 for providing visual data for a user. Thus, the system 100 permits the user to interactively designate views to be combined.

Furthermore, a printer can be connected to the system 100 via a parallel port 16 for printing the combined visual representations, or a modem can be connected via a serial port 15. The system 100 can be connected to a network via the serial port 15 and a modem, or via a communication adaptor 18 (an Ethernet® or a token ring card) for communicating with another computer.

A remote transceiver is connected to the serial port 15, or to the parallel port 16, for exchanging data with the system 100 by using infrared rays or wires.

A loudspeaker 23 is used to receive, via an amplifier 22, an audio signal obtained by D/A conversion (digital/analog conversion) performed by an audio controller 21, and to output the signal as sound. The audio controller 21 performs the A/D (analog/digital) conversion of audio information received via a microphone 24 in order to introduce external audio information into the system 100.

As is described above, it would be easily understood that the system 100 of the present invention can be provided by a typical personal computer (PC) or a workstation, a notebook PC, a palmtop PC, a network computer, a television set or other electric home appliance that incorporates a computer processor, a game machine having a communication function, a communication terminal having a communication function, such as a telephone, a facsimile machine, a portable telephone, a PHS or a personal data assistant (PDA), or a combination of the components described above. It should be noted, however, that these components are merely examples and not all of them are requisite for the present invention.

The above mentioned four blocks (i.e., View Manager, View Retriever, View Composer, and View Displayer) will now be described.

View Manager

The view manager manages individual visualization and their attributes, such as calculation procedures (e.g., summation, keyword search display) for selecting visualization, the name of the visual representation, the number of dimensions and the domains for the dimensions.

The unit used to express such a data set is called a "view", and the above description is called a "view definition". When a user actually obtains a specific set of data by using spreadsheet software or by using an Internet search, and when the user selects the above view, that view is embodied by the view manager, with one instance of the view that represents the data set being generated and being displayed by the view display.

Figure 1:
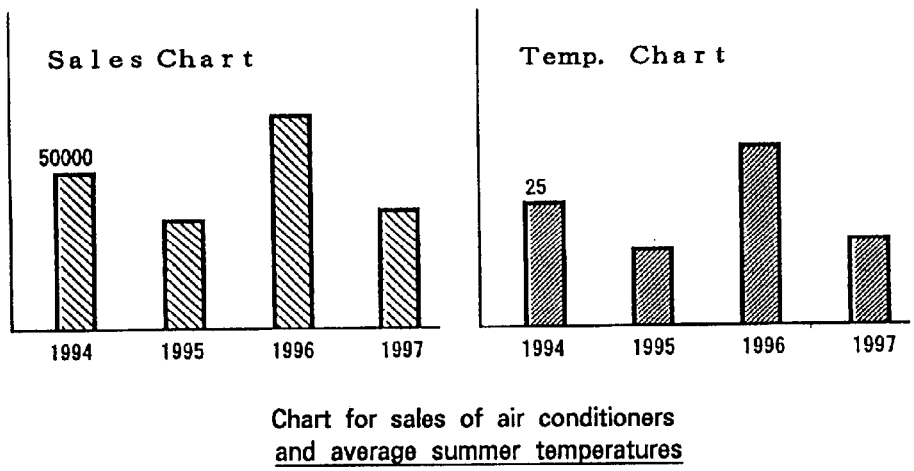
FIG. 1 is a chart showing air conditioner sales and average summer temperatures.
Figure 2:
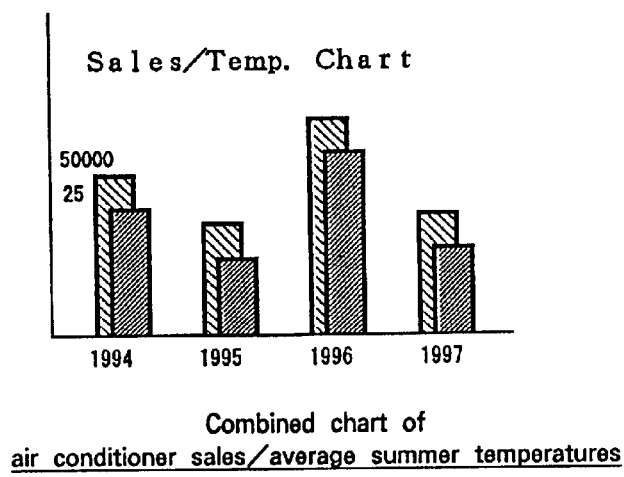
FIG. 2 is a combined chart showing air conditioner sales and average summer temperatures.

The two charts used in FIG. 1 are both instances of the same bar chart, and the view description is as follows:

<name>BARCHART</name> // view name BARCHART
<dim>2</dim> // dimensional count 2
<axis name="year">YEAR</axis> //first dimension name (year) and domain (fiscal year)<
axis name="sales">NUMBER</axis> // next dimensional name (sales) and domain (numeral)<
mapping>2D_TABLE</mapping> // corresponding calculation procedures.

The view description can include a class hierarchy similar to a class definition for an object-oriented language. From the above bar chart view, the view instances can be defined wherein the second dimension is specified respectively in a sales domain (<axis>SALES</axis>), and a temperature domain (<axis>TEMPERATURE</axis>) which are a sub-class of the numeral (NUMBER). When there are two domains, D1 and D2, each element in D2 can always be mapped to one of the elements in D1, and D2 is said to be a "specialized domain" of D1. In this way, the domains are described by an independent domain hierarchy.

The condition where such a sub-class relation between the views can be defined. First, dimensions that correspond to the individual dimensions of a "parent" view are also present in a "child" view, and the domains of the dimensions in the child view are the same as those in the parent view, or are specialized domains otherwise.

Second, when a plurality of visual elements (e.g., one bar in a bar chart or one dot in a line chart) of the individual dimensions are expressed as vectors consisting of values, and when the vectors correspond to the same element in the parent view, all of these elements are handled as one element of the parent view.

As a result, it is ensured that an arbitrary instance in the child view can be unambiguously displayed even when the parent view is used. In cases when there are multiple mappings from a specified domain to the original domain, or when the number of dimensions for the child view is greater than that for the parent view, the views are handled by the view retriever/composer. It is apparent that while the mapping from the child view to the parent view is performed in accordance with the class hierarchy, the present invention includes a feature whereby non-compatible views can be combined.

View Retriever

When a specific set of data is defined by entering a table or by retrieving a database, a set of applicable calculation procedures can be determined based on the definition of the data set, and in addition, the available selections that represent the calculation procedures can be determined. When the user enters two-dimensional data using a graph creation application, (calculation procedures+) a visualization, such as a bar chart, a line chart or a pie chart, can intuitively be selected for the data set. When there are a plurality of such data sets, the view retriever computes the possible combinations of the view representations for these data sets.

Second, when a plurality of sets of data are displayed using a view, or when one set of data is displayed by a plurality of visualization methods that use a plurality of views, as mentioned above, it is preferable that views that are associated with each other be selected so that more information may be obtained.

Three types of combinations are available for the two views $v_i$ and $v_j$. First, there is "superimposition" which is when the views $v_j$ and $v_j$ have the same dimensions k, and when the domains of the dimensions in the view $v_i$ correspond to those having the same domains in the view $v_j$, both the elements for the two views can be simultaneously represented by one view.

Second, there is "neighboring" where one dimension having the same domain is present in both two-dimensional views $v_i$ and $v_j$, the two views are represented as being adjacent in this dimension. Conceptually, the neighboring can be expanded up to k dimensions (when, for example, two dimensions are used in common for a three-dimensional view, the views are adjacent on a plane shared by the two dimensions).

Lastly, there is an "adhoc combination" where a specific view $v_a$ is defined for views $v_i$ and $v_j$, and the dimensions for $v_i$ and $v_j$, their domains and its corresponding dimensions/domains/values are defined in advance. The adhoc combination is frequently employed by a view designer, and is defined for two views that can not be combined by superimposition or neighboring.

For example, when a view for sales for individual branches (the names of branches along the X axis and the sales values along the Y axis) and a view wherein the branches are represented by names on the map of Japan (coordinates on the map lying along the X and Y axes) are always employed together, both can be displayed on the map of Japan (the X and Y axes, therefore, continue to represent coordinates on the map), and a view can be defined where the names of branches and the sales values are superimposed on the map as a bar chart.

The three types of combinations can be expanded to provide "n" views. By using superimposition, all the views can be compressed to provide a single view, while by using neighboring, a combination is acquired that covers a plane with a square, two-dimensional view. The adhoc mapping corresponds to superimposition. When the two domains D1 and D2 differ, a domain D3 that can be shared can be obtained. For example, in the case of a superordinate domain, when D1 and D2 have a superordinate/subordinate relations in the domain hierarchy, the superordinate domain is regarded as D3 (e.g., NUMBER and TEMPERATURE).

A further example is a common superordinate domain, when a superordinate domain D3 that is used in common for D1 and D2 exists (for example, NUMBER for SALES and TEMPERATURE). Additionally, there is a mapping domain, wherein a unique mapping and domain D3 is defined for all the elements of D1 and D2 (for example, when there are two domains, the names of branches and employee IDs, and when mapping is defined by connecting employees having employee IDs to the names of the branches to which they belong, the names of the branches can be used as the domain D3).

A view that has a non-compatible domain can be combined with such a domain D3. However, since the number of combinations of available views increases, the number and the range for which the domain D3 is applied must actually be limited.

The limitation is referred to as a cost. Various costs (limiting parameters) can be defined such as, calculation procedures for a view and an application cost for each view. Secondly, a cost is defined for each superimposition, neighboring and adhoc mapping. The cost may be statically defined using a combination of domains in a view, or may be dynamically defined by the instances of a view. For example, the cost of superimposition can be obtained by calculating the correlation of data that are represented in two views. Thirdly, a cost that is proportional to the distance in the domain hierarchy is defined for the superordinate domain. Fourth, a cost that is proportional to the sum of the distances from the original domains to the common superordinate domain is defined for the common superordinate domain. Fifth, a cost for each mapping is defined for the mapping domain. A combination of views may be allowed only when the sum of the costs does not exceed a threshold value.

Generally, when "n" sets of data, $\{d_1 \ldots d_n\}$ are given, the view retriever calculates an associated view in the following manner (when one set of data is to be displayed using a plurality of views, $d_i$, need to be duplicated).

First, a set of views $V=\{v_{i,1} \ldots v_{i,k}\}$ is obtained that can represent the i-th data set $d_i$ by using specific calculation procedures (i=1, ... n). Second, if all pairs of $v_{i,p}$ and $V_{j,q}$ (i≠j) that represent individual data sets are combinable, the combination types and the total of costs required for such combinations are calculated. Finally, when the pair of views that is obtained is assumed to be a non-directed edge, the method for correlating the n sets of data corresponds to a linked graph having "n" views that represent the individual data sets (when an adhoc combination or a mapping domain is included, views of the combination must be compressed to provide a single view, or the domain must be updated for re-calculation). In this graph, the edge for which the sum of the costs is the lowest constitutes the optimal combination of views.

View Composer

The solution of the view composer for the arrangement of data sets, which is determined by the view retriever, corresponds to a method for allocating views arranged like tiles on a two-dimensional screen. An efficient arrangement is the spiral view string shown in FIG. 5, or a matrix arrangement wherein "m" views are provided in a column and "n" views in a row. The superimposition corresponds to the subsequence of views having the same number.

There are many limitations that affect an arrangement of a view string in this form. For example, in an "m*n" view arrangement of "n" views in a column and m in a row, the domains in the dimension along the X axis are $D_{x1}, \ldots D_{xm}$, and the domains in the dimension along the Y axis are $D_{y1}, \ldots D_{yn}$. A solution is acquired only when there is one and only one view that has, as a domain, an arbitrary pair<$D_{xi}, D_{yj}$>(i=1, ... m; j=1, ... n). Since it is known that the above arrangement cannot be efficiently calculated, the method for calculating a combination of views and the arrangement method that were described above are employed only when the number of sets of data is small. Generally, a view arrangement performed under the following modest conditions is considered.

First, one of the most important data sets is selected and defined as a main data set. Normally, the data set that is first obtained is defined as the main data set. Then, for a view "v" that can represent the main data set, the following are obtained. That is, a data set $S_0$ that ensures superimposition/adhoc mapping with "v", and its view $v_{SO}$, a data set $S_X$ that can be arranged in an adjacent position in the X axis, and its view $v_{SX}$ and a data set $S_Y$ that can be arranged in an adjacent position in the Y axis, and its view $V_{SX}$ are obtained.

As a result, when one view of the main data set is selected, the superimposing and the neighboring of views can be computed that together produce a cross-shaped form. A data set that cannot be superimposed or that cannot neighbor the main data set, and its view may be arranged diagonally relative to the view of the main data set (FIG. 6). When a view of the main data set and a view that can neighbor it are arranged in the order of their relative neighboring costs, the views can be displayed in descending order of correlation, and calculations for the cross-shaped arrangement can be automatically and efficiently performed.

Since the view that can be superimposed can neighbor the main data set either vertically or horizontally, $\{v_{SO}, v_{Sx}, v_{Sy}\}$ can be dynamically changed by an interactive user selection process. If the side which the view should neighbor first is determined in advance for each pair of views, or the interpretation that the view neighbors a right or a lower portion is given in advance, then manipulation by the user is not required.

When for a special case there are only two data sets, a combination of views that can be represented by superimposing or neighboring the two data sets is obtained, so that the views can be displayed in ascending order of the costs of the combination.

The view retrieval/combination algorithm for arranging views operates in the following manner. First, it is assumed that given data sets are $S_1, S_2, \ldots S_k$, that the sets of calculation procedures applicable for the data set $S_1$ are $P_1, P_2, \ldots P_k$, and that the view sets are $V_1, V_2, \ldots V_k$.

Second, for the main data set $S_i$, one view $v_i \epsilon V_j$ is determined for which the total cost of the calculation procedures and of the view generation is the least.

Third, for a data set $S_j$(i≠j) other than the main data set, the view retriever obtains a view $\{v0_j\}$ that can be superimposed on the view $v_i$, a view $\{vx_j\}$ that can neighbor the dimension that corresponds to the X axis, and a view $\{vy_j\}$ that can neighbor the dimension that corresponds to the Y axis, all of which are those having the least cost.

Fourth, all the superimposition types are applied for the view $v_i$ for the main data. The views that can neighbor the dimensions corresponding to the X and Y axes are arranged in ascending order of their costs, and the arrangement direction is tacitly defined as the right lower direction. When side neighboring/vertical neighboring is designated in advance for each view, the views are arranged as is designated.

Fifth, when there is a set of data that can be combined by adhoc mapping, the data set is employed only if the cost is lower than that for any other available combination that includes the data set, and if the set of views that can be superimposed on $v_i$ is unchanged.

View Displayer

The view displayer is operated based only on the static view description and the information provided for domains to compute a combination of views that represent "n" sets of data. Actually, however, a user requests the sequential preparation of a set of data while interactively entering table data, examining a database and searching for information, or changing the combination of views in accordance with actual data and search results.

To cope with this request, the view displayer permits the following interactive designations for the above described view retrieval/composition algorithm. First, a designation of a main data set, second a designation of views for the main data set, third a designation of views for a data set other than the main data set, and of an arrangement for the views, and a selection to determine whether adhoc mapping is permitted for a specific view.

In particular, the list of column-shaped neighboring views shown in FIG. 7 is provided to designate a neighboring view along the X axis/Y axis, so that a user can sequentially select desired views while scrolling through the list.

In a first embodiment, to view composition for yearly sales of air conditioners and daily newspaper articles concerning air conditioners, the following occurs.

First, data for yearly sales of air conditioners are represented using a pair of attributes (e.g., year and sales), and data for daily newspaper articles for air conditioners are represented by a pair of attributes (e.g., date and article title).

For the sales data, a view of a bar chart is most frequently employed wherein the X axis represents a fiscal year and the Y axis represents the sales.

The newspaper article data are normally represented using a view of a one-dimensional title list that has as an attribute only a date. In this case, the second attribute with a domain that can have the same set of values as that of the sales is designated in order to obtain the sales value for the same year as that of the date of the newspaper article. Since a one-to-one correspondence can be acquired by using the date of the newspaper article that corresponds to the year quoted for the sales, the numerical attribute that uses the sales as a reference is incremented or decremented, so that a plurality of newspaper articles in the same year can be arranged in the order beginning with the latest.

For example, as the sales of air conditioners in 1995 equaled 50 million yen, (1995, 50,000,000) is depicted. Then, if there were three newspaper articles during the pertinent year, they are listed in order (Jun. 1, 1995 air conditioner sales became active)

(Jul. 3, 1995 electronic makers officially corrected figures for sales of air conditioners)

(Jul. 25, 1995 sales of air conditioners reached highest level ever), the sales attribute 50,000,000 is given for the last article, and, from the top, 40,00,000 and 45,000,000 are provided for the other two articles (a value along the Y axis that equals one scale division is sequentially subtracted).

As a result, a view where the title of the newspaper is superimposed on the sales graph in accordance with the year, is obtained as a two-dimensional view of (e.g., year, sales). The view has the attribute (e.g., year, sales), and can be combined with another view. Data for the titles of newspaper articles can be combined with an arbitrary two-dimensional view for which the date and the year are provided along the X axis (or the Y axis).

Second Embodiment

In a second embodiment, view composition of branch/sales increase data and general manager/service term data are requested. Two-dimensional bar chart views are employed for both data, and they have the respective attributes (e.g., branch name, %) and (e.g., general manager name, service years). The branch names and the general manager names have a one-to-one correspondence, the domain for % is −1000 to 1000, and the domain for the service year is 0 to 40. At this time, both views can be combined into a view (e.g., branch/general manager name, sales increase rate/service term). For the numerical attribute, the upper and lower limits need only be adjusted to provide a scale of, for example, 10% or 0.2 year.

According to the present invention, a plurality of analysis methods and visual representations are combined in order to improve the employment of conventional data retrieval or the OLAP method. In addition, since visualization obtained through data search or at an electronic library can also be a target to be combined, higher-level decision and information extraction is ensured. Further, the method and the system provide for the obtaining of new information from phenomena that do not at a glance seem to be related, and for assisting the decision process by providing reference data.

Figure 9:
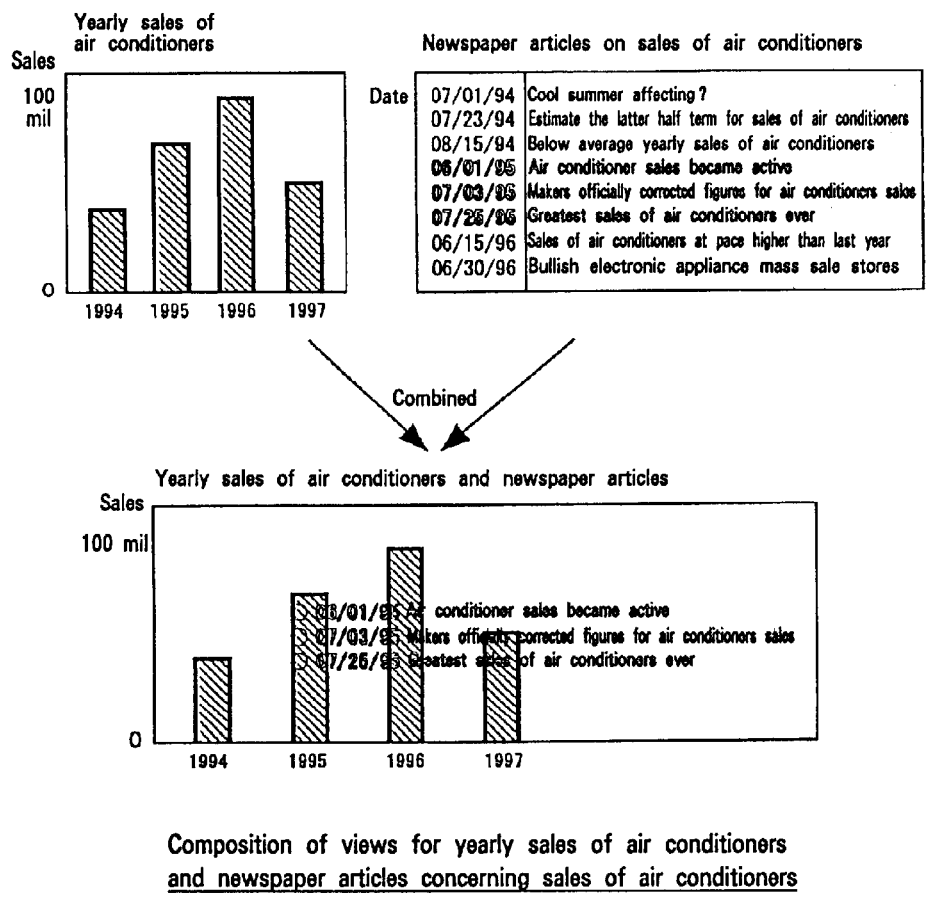
FIG. 9 is a diagram showing a combined view of the yearly sales of air conditioners and of daily newspaper articles concerning air conditioners.
Figure 10:
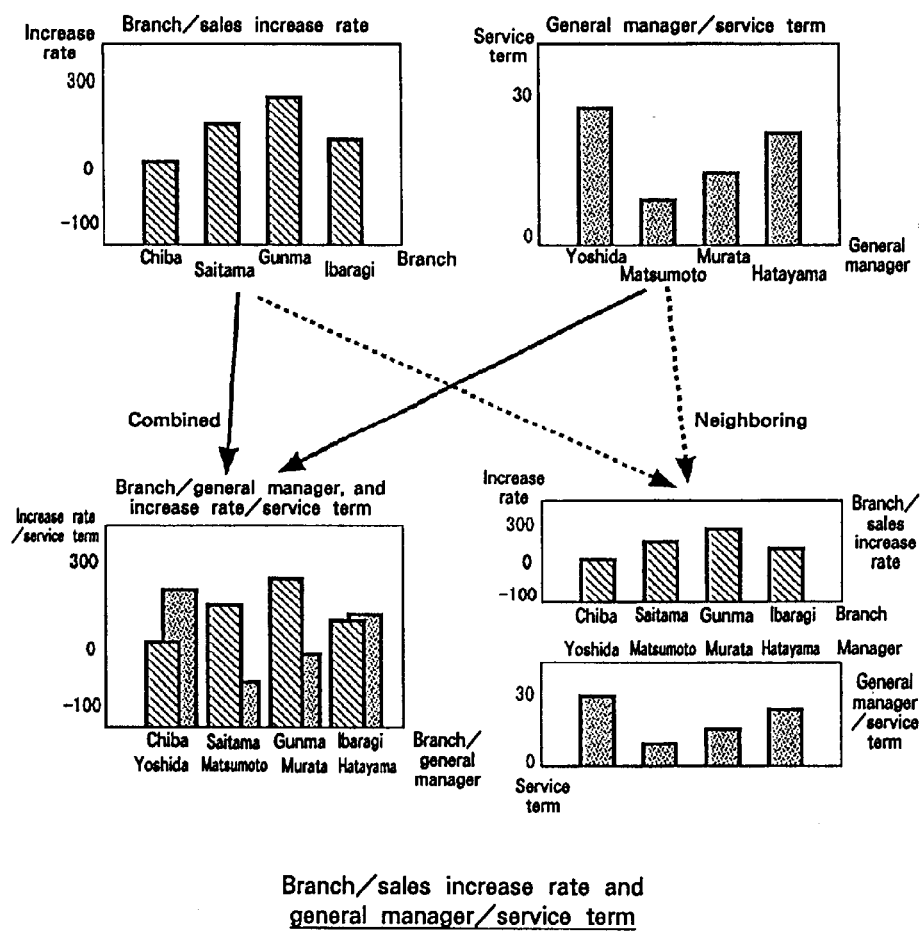
FIG. 10 is a diagram showing a combined view for branch/sales increase rate data and general manager/service term data.
Figure 11:
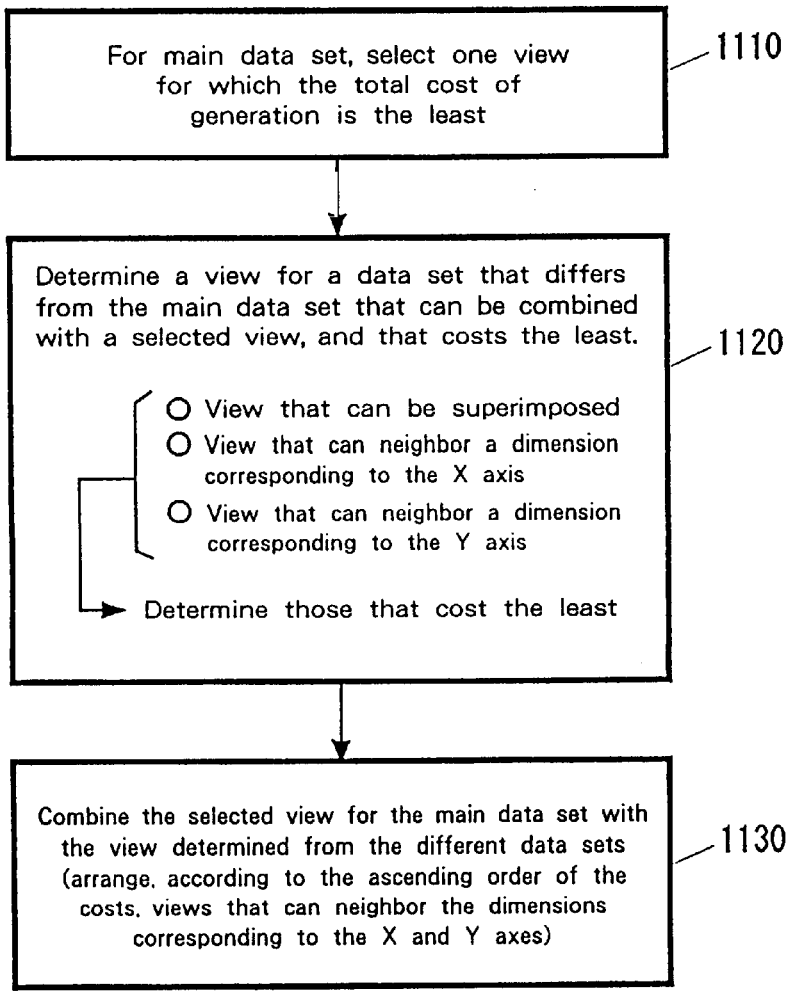
FIG. 11 is a flowchart showing a view composition method according to the present invention.

For example, a combination of text and a graph that is conventionally available to a user can be computed automatically as is shown in FIGS. 3 and 9.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. A view composition system, for combining multiple visual representations to provide a combined view constituted by sets of data for visualization, each set of data described by using at least one of a number of dimensions, domains for the individual dimensions, calculation procedures for arranging individual elements in the view, and an inclusion relationship of the domains, said system comprising:

a view manager for managing, as a plurality of views, sets of data for individual visual representation;

a view retriever for retrieving combinable views from the plurality of views, enabling presentation of alternative representations of data from the sets of data; and a view composer for automatically combining views from said combinable views retrieved by said view retriever without user intervention, wherein said combined views comprise a synthesis of multiple visual representations of multiple sets of data, wherein each one of said multiple sets of data provides at least one view, and wherein each said view comprises a logical entity with associated domains and visual means for mapping each data element into a visual structure.

2. The view composition system according to claim 1, further comprising:

a view displayer for displaying the views that are combined by said view composer.

3. The view composition system according to claim 1, wherein said visual representations include at least one of a graph data, chart data, a database, table data; and text data.

4. The view composition system according to claim 1, wherein each of said visual representations includes a name of said visual representation, a number of dimensions and a domain for each dimension, calculation procedures, and a hierarchical relationship and a corresponding relationship between domains.

5. The view composition system according to claim 1, wherein the view description, comprising the number of dimensions, the domains for individual dimensions, the calculation procedures for arranging elements, the inclusionship relation of the domains, and a superordinate/subordinate relationship, are stored as a set of visual representations on a storage device.

6. The view composition system according to claim 1, wherein views to be combined are interactively designated.

7. The view composition system according to claim 1, wherein said view retriever provides for a superimposition of views.

8. The view composition system according to claim 1, wherein said view retriever provides for a neighboring of views.

9. The view composition system according to claim 1, wherein said view retriever provides for an ad hoc combination of views.

10. The view composition system according to claim 1, wherein said view composer for combining said views produces a cross-shaped form.

11. The view composition system according to claim 1, wherein said view composer produces a view arranged diagonally relative to a view of a main data set.

12. The view composition system according to claim 1, wherein said view composer for combining views of a main data set and a neighboring view of said main data set produces a view arranged in a descending order of correlation.

13. The view composition system according to claim 2, wherein said view displayer provides interactive designation of at least one of:
   designation of a main data set;
   designation of views for said main data set;
   designation of views for a data set other than said main data set;
   an arrangement of said views for said main data set and said data set other than said main data set; and
   selection to determine whether an ad hoc mapping is permitted for a specific view.

14. A view composition method, for combining multiple visual representations to provide a combined view constituted by sets of data for visualization, each set of data described by using at least one of a number of dimensions, domains for the individual dimensions, calculation procedures for arranging individual elements in the view, and an inclusion relationship of the domains, said method comprising:
   selecting from a main data set a view that has the lowest total generation parameter, said selected view including a combination of two independent collections of entities;
   determining for data sets that differ from said main data set, views that can be combined with said selected view and that have the lowest predetermined parameters, enabling, presentation of alternative representations of data from the differing data sets; and
   combining said selected view and views from said determined views,
   wherein each said view comprises a logical entity with associated domains and visual means for mapping each data element into a visual structure, and
   wherein each of said main data set and each one of said data sets that differ from said main data set provide at least one view.

15. The view composition method according to claim 14, wherein determining said views that can be combined comprises determining a view having a lowest pre-determined parameter to be any of the view that is to be superimposed, a neighboring view that is to be in a first dimension that correspond to the X axis, and a neighboring view that is to be in a second dimension that corresponds to the Y axis.

16. The view composition method according to claim 14, wherein combining said selected view and views from said determined views further includes arranging, in a predetermined parameter order, beginning with the lowest pre-determined parameter, views that are to constitute neighbors in the dimensions that correspond to the X axis and the Y axis.

17. A medium for storing a program for combining multiple visual representations to provide a combined view constituted by sets of data for visualization, each set of data described by using at least one of a number of dimensions, domains for the individual dimensions, calculation procedures for arranging individual elements in the view, and an inclusion relationship of the domains, said program comprising:
   a view management function for managing, as a plurality of views, sets of data for individual visual representation;
   a view retrieval function for retrieving combinable views from the plurality of views, enabling presentation of alternative representations of data from the sets of data; and
   a view composer function for automatically combining views from said combinable views retrieved by said view retrieval function without user intervention,
   wherein said combined views comprise a synthesis of multiple visual representations of multiple sets of data,
   wherein each one of said multiple sets of data provides at least one view, and
   wherein each said view comprises a logical entity with associated domains and visual means for mapping each data element into a visual structure.

18. The medium as claimed in claim 17, wherein said program further comprises a view display function for displaying the views formed by said view composer function.

19. The view composition system, as claimed in claim 1, wherein said view retriever computes possible combinations of said visual representations for multiple sets of data.

20. The view composition system, as claimed in claim 1, further comprising:
   a view materialization mechanism for automatically generating composed views from said multiple sets of data.

21. The view composition method according to claim 1, wherein said combined views are mathematically defined by domains and visual structures.

22. The view composition method according to claim 1, wherein a graphical object and a size, shape, color, and coordinate in a display are physically assigned.

23. The view composition method according to claim 1, wherein a graphical representation is recomputed when a new collection of data records is provided.

24. The medium according to claim 14, wherein said combined selected view and said determined views are mathematically defined in terms of domains and visual structures.

25. The medium according to claim 17, wherein said combined views are mathematically defined by domains and visual structures.

26. The medium according to claim 17, wherein a graphical object and a size shape, color, and coordinate in a display are physically assigned.

27. The medium according to claim 17, wherein a graphical representation is recomputed when a new collection of data records are provided.

* * * * *